(12) United States Patent
Sakamoto et al.

(10) Patent No.: US 7,735,892 B2
(45) Date of Patent: Jun. 15, 2010

(54) FRONT PORTION STRUCTURE OF VEHICLE

(75) Inventors: Junichi Sakamoto, Saitama (JP); Sadamichi Enjo, Saitama (JP); Hideo Fujiwara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 36 days.

(21) Appl. No.: 12/032,493

(22) Filed: Feb. 15, 2008

(65) Prior Publication Data

US 2008/0197647 A1 Aug. 21, 2008

(30) Foreign Application Priority Data

Feb. 21, 2007 (JP) .............. 2007-041172
Feb. 21, 2007 (JP) .............. 2007-041185

(51) Int. Cl.
*B62H 5/00* (2006.01)

(52) U.S. Cl. ............... 296/37.1; 296/37.13; 296/37.15; 296/37.16; 280/788; 280/124.147; 180/219

(58) Field of Classification Search ............... 296/198, 296/203.02, 203.03, 30, 204, 187.08, 187.09, 296/37.1, 37.16, 37.15, 37.13; 280/788, 280/124.147, 24.155; 180/219

See application file for complete search history.

(56) References Cited

U.S. PATENT DOCUMENTS 5,127,560 A * 7/1992 Miyamoto et al. .......... 224/413
7,219,939 B2 * 5/2007 Kamemizu et al. ......... 296/37.1
2001/0029758 A1 * 10/2001 Kehr ......................... 70/252
2003/0222473 A1 * 12/2003 Yamamoto et al. ......... 296/37.1
2004/0195855 A1 * 10/2004 Takeshima ................. 296/37.1
2005/0155804 A1 * 7/2005 Kamemizu et al. ......... 180/219
2005/0156000 A1 * 7/2005 Kamemizu et al. ......... 224/413
2006/0220407 A1 * 10/2006 Misaki et al. .............. 296/37.1

FOREIGN PATENT DOCUMENTS

EP  1 557 348 A2  7/2005
JP  2005-112313 A  4/2005

* cited by examiner

*Primary Examiner*—Patricia L Engle
*Assistant Examiner*—SunSurraye Westbrook
(74) *Attorney, Agent, or Firm*—Birch, Stewart, Kolasch & Birch, LLP

(57) ABSTRACT

A vehicle front portion structure having a storage portion for facilitating maintenance for a vehicle front portion includes a first storage portion that includes a bottom portion extending in the longitudinal direction of a vehicle body, left and right walls extending upwardly from the bottom portion, a ceiling portion connecting the left and right walls and a back wall closing the respective backs of the bottom portion, left and right walls and ceiling portion. The first storage portion is provided with a maintenance opening formed to be spanned among the back wall, a left wall continuous with the back wall and the bottom portion continuous with the back wall, and with the lid body which covers the maintenance opening in an attachable and detachable manner. A key cylinder arrangement structure for a vehicle is provided that can significantly enhance operability of a key cylinder while preventing tampering or theft.

6 Claims, 13 Drawing Sheets

FRONT PORTION STRUCTURE OF VEHICLE

CROSS-REFERENCE TO RELATED APPLICATIONS

The present application claims priority under 35 USC 119 to Japanese Patent Application Nos. 2007-041172 filed on Feb. 21, 2007 and 2007-041185 filed on Feb. 21, 2007 the entire contents thereof are hereby incorporated by reference.

BACKGROUND OF THE INVENTION

1. Field of the Invention

The present invention relates to a front portion structure of a vehicle equipped with a light device provided on a front cowl covering a vehicle body and to an improvement in a key cylinder arrangement structure for a vehicle provided with a key cylinder that mechanically enables a start or operation of the vehicle when an electronic key system does not establish authentication.

2. Description of Background Art

A front portion structure of a vehicle is known wherein a front cowl covering a vehicle body is provided on a front portion of the vehicle body that is equipped with a light device and a leg shield having a storage portion for storing an article therein is provided between the light device and a seat on which a rider sits. See, for example, Japanese Patent Laid-open No. 2005-112313 (FIGS. 14 and 15).

In FIG. 14 of Japanese Patent Laid-open No. 2005-112313, a first article storage portion 191 for storing an article therein is disposed on the left of the leg shield 158. A second article storage portion 192 is disposed on the right of the leg shield 158. A storage case 193 is detachably provided in the first article storage portion 191 disposed on the left side. An end wall 197a of the first article storage portion 191 is provided with a maintenance window 201, which is covered by a detachable lid 202.

In FIG. 15 of Japanese Patent Laid-open No. 2005-112313, when maintenance work is carried out, the storage case 193 of the first article storage portion 191 is pulled out and the lid 202 covering the maintenance window 201 is removed to open the maintenance window 201. Thereafter, maintenance work such as replacement of a bulb 171a of a headlight 171 is performed by passing a hand through the maintenance window 201.

In addition, the second article storage portion 192 disposed on the right of the vehicle is not provided with an opening. When maintenance such as the replacement of a right-hand bulb is performed, it is necessary to remove a whole storage recess portion 214 attached to the leg shield 158.

Even if the end wall of the second article storage portion 192 on the right side of the vehicle is provided with an opening, the position of the bulb axis of a lamp device may not be aligned with the position of the maintenance opening. Thus, in such a case, since an individual's hand cannot reach a bulb, it is sometimes difficult to perform maintenance including bulb replacement for the front portion of the vehicle.

In addition, a vehicle is known wherein an electronic key system that enables a start or operation of a vehicle when authentication is established between a portable transmitter and a receiver and with a leg shield for shielding the front of the legs of a rider sitting on a seat and the leg shield is provided with a key cylinder that enables a start or operation of the vehicle when the electronic key system does not establish authentication. See, for example, Japanese Patent Laid-open No. 2005-112313 (FIG. 18).

In FIG. 18 of Japanese Patent Laid-open No. 2005-112313, a leg shield 158 shielding the front of the legs of a rider is provided with a second article storage portion 192. The second article storage portion 192 includes a storage recess portion 214 for storing articles and a lid member 215 provided to be able to open and close the storage recess portion 214 in directions of arrows of the figure via a pivot shaft 216.

A key cylinder lock 236 having a key hole 238 is disposed at the storage recess portion 214 in such a manner that the key hole 238 faces the inner lateral surface of the storage recess portion 214.

As described above, the key cylinder lock 236 is disposed on the inner lateral surface of the storage recess portion 214 to provide a structure hard to be tampered. However, it is difficult to identify the key hole of the key cylinder with the rider mounting on the vehicle. There is room for improvement.

SUMMARY AND OBJECTS OF THE INVENTION

It is an object of an embodiment of the present invention to provide a vehicle front portion structure having a storage portion that facilitates maintenance for a vehicle front portion.

According to an embodiment of the present invention, a front portion structure of a vehicle includes a front cowl provided at a front portion of a vehicle body to cover the vehicle body with a light device having at least a portion that is provided at the front cowl so as protruding rearward. A leg shield is disposed between the light device and a seat on which a rider sits and includes a storage portion for storing an article therein. The storage portion includes a bottom portion extending in the longitudinal direction of the vehicle body with left and right walls extending upwardly from the left and right sides, respectively, of the bottom portion. A ceiling portion connects together the left and right walls with a back wall which closes the respective backs of the bottom portion, left and right walls and the ceiling portion. A bulb axis of the light device is disposed near the back wall as viewed from the rear of the vehicle body with the storage portion being provided with a maintenance opening spanned among the back wall, at least one lateral wall continuous with the back wall, and the bottom portion or ceiling portion continuous with the back wall. A lid body detachably covers the maintenance opening forming the maintenance opening being used to maintain the bulb.

According to an embodiment of the present invention, the bulb axis of the light device is disposed outside the back wall as viewed from the rear of the vehicle and the maintenance opening is provided to extend from the back wall at least to a lateral wall closer to the bulb axis of the light device.

According to an embodiment of the present invention, the storage portion is provided with a storage case as a stuff box in an openable and closable manner with the storage portion serving as a drawer.

According to an embodiment of the present invention, the light device is a pair of light devices, one light device and the other light device, spaced apart from each other on the left and right of the vehicle, the opening is disposed near a bulb axis of the one light device of the light devices. A second storage portion that is larger in size than the back wall is disposed near the other light device of the light devices with the second storage portion being provided with a second maintenance opening.

According to an embodiment of the present invention, the lid body is provided at one end with an engaging claw to be engaged with a hole portion of the storage portion and at the other end with an engaging portion to be engaged with the storage portion. The engaging claw is engaged with the hole portion and the engaging portion is engaged with the storage portion.

According to an embodiment of the present invention, the bulb axis of the light device is disposed near the back wall as viewed from the rear of the vehicle body and the storage portion is provided with the maintenance opening spanned among the back wall, at least one lateral wall continuous with the back wall, and the bottom portion or ceiling portion continuous with the back wall and is used to maintain the bulb. Thus, the maintenance opening can largely be ensured without being influenced by the size of the storage portion composed of the back portion, the lateral portions, the bottom portion and the ceiling portion.

If the maintenance opening is enlarged, the bulb of the light device can easily be replaced by removing the lid body, by passing a hand through the maintenance opening and by reaching out the hand for the bulb of the light device. Thus, the maintenance such as replacement of the bulb or the like can be enabled without the removal of the leg shield, that is, the maintenance for the vehicle front portion including the light device can easily be performed.

In addition, since the maintenance opening is increased in size, design restrictions can be reduced. For example, it becomes not necessary to otherwise determine the position of the storage portion, taking into account the maintenance performance for the bulb of the light device. Since the design restrictions are reduced, the flexibility of vehicle design can be increased.

According to an embodiment of the present invention, since the maintenance opening is provided to extend from the back wall at least to the lateral wall closer to the bulb axis of the light device, the area of the opening is expanded by the extension to the lateral wall. Thus, when the lid body is removed and a hand is passed through the maintenance opening, even if the central position of the bulb of the light device is offset from the position of the opening, maintenance work for the bulb can easily be performed by reaching out a hand for the bulb of the light device.

According to an embodiment of the present invention, when the maintenance opening is continuously formed to extend from the back wall to the lateral wall, the storage case is formed as a drawer. Thus, the drawer can close the maintenance opening and the lid body. Since the drawer is provided in the storage portion, the maintenance opening and lid body can be made inconspicuous from the outside of the vehicle, which can prevent the external appearance of the vehicle from being impaired.

According to an embodiment of the present invention, the maintenance opening and the second maintenance opening are provided near the one light device and the other light device, respectively; therefore, both the bulbs of the light devices can be replaced by passing a hand through the associated maintenance openings. Since the bulb can be replaced by passing the hand through the maintenance opening disposed near the bulb, the maintenance performance for the bulb can fiber be enhanced.

According to an embodiment of the present invention, the lid body is provided at one end with the engaging claw to be engaged with the hole portion of the storage portion and at the other side with the engaging portion to be engaged with the storage portion, the engaging claw is engaged with the hole portion and the engaging portion is engaged with the storage portion.

Since the lid body is integrally formed with the engaging claw and the engaging portion at one end and the other end, respectively, it can simply be molded.

In addition, since the number of engaging positions using the engaging portion is one, the number of parts for the engaging portion can be reduced. Since the lid body can simply be molded and the number of parts for the engaging portion is reduced, the cost of parts for the lid body can be suppressed.

It is an object of an embodiment of the present invention to provide a key cylinder arrangement structure for a vehicle that can significantly enhance operability of a key cylinder while preventing tampering, theft and the like.

According to an embodiment of the present invention, a key cylinder arrangement structure for a vehicle including an electronic key system which enables a start or operation of the vehicle only when authentification is established between a portable transmitter taken along by a rider and a receiver installed in the vehicle. A leg shield which covers the front of the legs of the rider sitting on a seat and has an upper portion including a stuff box is provided together with a key cylinder which mechanically enables a start or operation of the vehicle by insertion-operating a key adaptable when the electric key system does not establish authentification. The key cylinder is disposed so that a key cylinder axis is parallel to the longitudinal axis of the vehicle and is provided at the leg shield so as to face the rider sitting on the seat. The stuff box is provided with an appearance member forming a design surface of the leg shield with the key cylinder being covered by the appearance member when the stuff box is closed.

According to an embodiment of the present invention, the stuff box is a drawer having an opening at an upper surface thereof and the key cylinder is disposed below a bottom portion of the drawer.

According to an embodiment of the present invention, the stuff box is a drawer and the appearance member is a component constituting a knob portion on which a hand of the rider is put when the drawer is opened.

According to an embodiment of the present invention, the stuff box is openable in a range where the stuff box does not come into contact with the leg of the rider sitting on the seat.

According to an embodiment of the present invention, the vehicle is a lower floor type vehicle including left and right foot placing portions on which the feet of the rider are placed when the rider mounts on the vehicle and a tunnel portion which connects the left and right foot placing portions and protrudes upward, the leg shield is configured to connect with the foot placing portion and with the tunnel portion, and the key cylinder is disposed at a position close to the tunnel portion and to the center of a vehicle body.

According to an embodiment of the present invention, since the key cylinder is disposed so that a key cylinder axis is parallel to the longitudinal axis of the vehicle, the direction of the key cylinder axis can be made approximately the same as that of the key inserted into the key cylinder by the rider. Thus, it becomes easy to insert the key into the key cylinder, which can significantly enhance the operability of the key cylinder.

In addition, since the key cylinder is covered by the appearance member when the stuff box is closed, it is possible to make the key cylinder less-visible from the third party, thereby preventing tampering or theft. In short, the present invention can maintain crime-prevention while enhancing the operability of the key cylinder.

According to an embodiment of the present invention, since the staff box is a drawer having an opening at an upper surface thereof and the key cylinder is disposed below a bottom portion of the drawer, the key cylinder is disposed at a position further less-visible from the third party. Since the position of the key cylinder is further less-visible from the third party, tampering, theft or the like can further be prevented.

According to an embodiment of the present invention, since the stuff box is a drawer and the drawer and the knob portion are made of different components, the respective shapes of the stuff box and appearance member can freely be set. Since the flexibility of setting the shapes is increased, the external appearance of the appearance member can be enhanced while sufficiently ensuring the capacity of the stuff box.

According to an embodiment of the present invention, the stuff box is openable in a range where it does not come into contact with the leg of the rider sitting on the seat. Even if the key cylinder is intended to be operated, for example, by inserting a long tool or the like into the key cylinder, since the tool interferes with the appearance member of the stuff box, it becomes difficult to insert the tool or the like into the key cylinder. In short, tampering or the like can further be prevented by limiting the opening stroke of the stuff box. In addition, since the stuff box is made hard to hit the legs of the rider, easiness of mount and dismount is not damaged.

According to an embodiment of the present invention, the key cylinder is disposed close to the tunnel portion protruding upward and to the center of the vehicle body. When the key cylinder is intended to be operated, for example, by inserting a long tool or the like into the key cylinder, since the tool interferes with the tunnel portion, it becomes difficult to insert the tool into the key cylinder. In other words, tampering or the like can further be prevented by disposing the key cylinder at a position close to the tunnel portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 13 is a cross-sectional view taken along line 5-5 of FIG. 12;

FIG. 14 is a cross-sectional view taken along line 6-6 of FIG. 12;

DETAILED DESCRIPTION OF THE PREFERRED EMBODIMENTS

Figure 1:
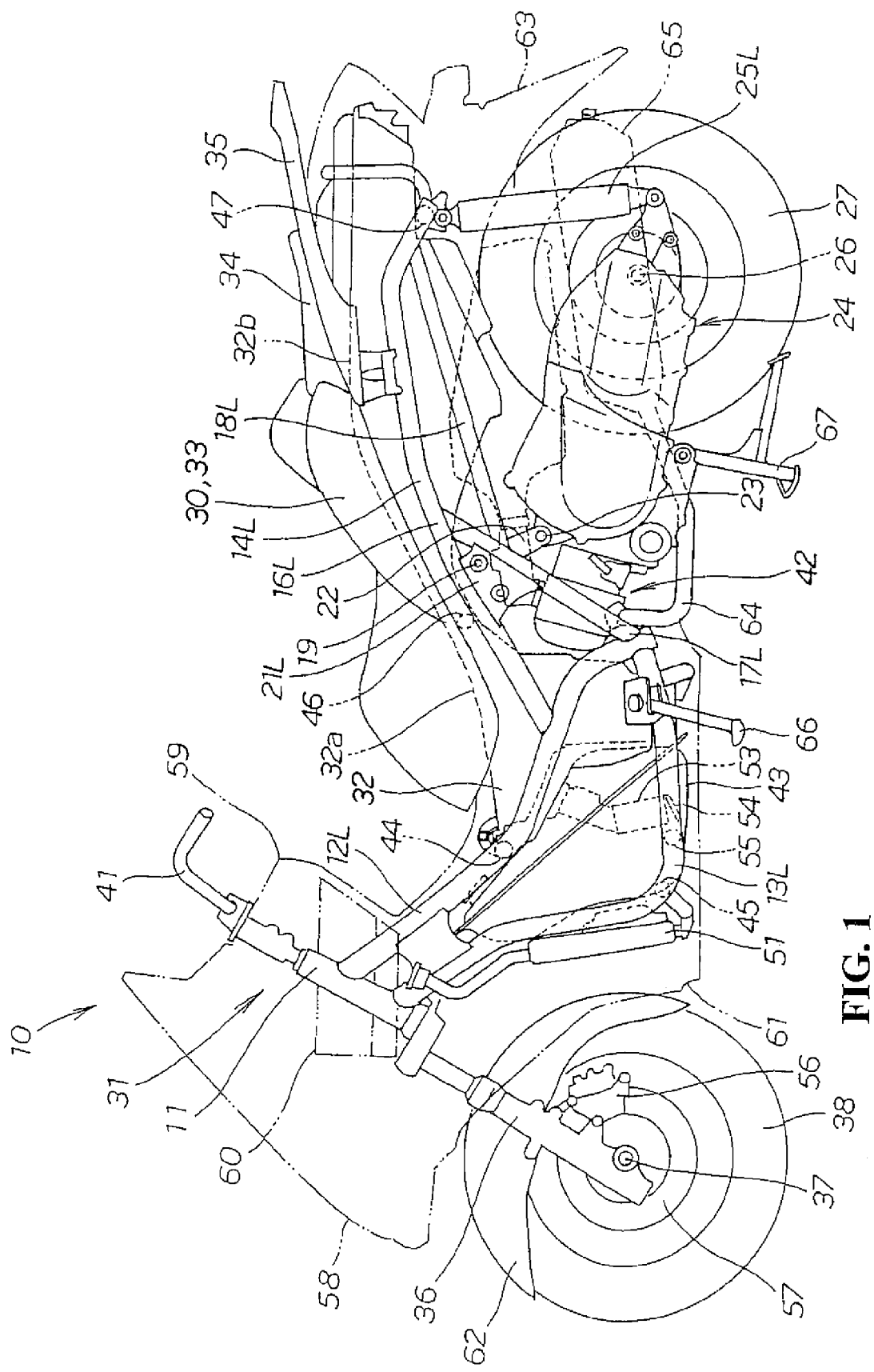
FIG. 1 is a left lateral view of a motorcycle according to the present invention.

The best mode for carrying out the present invention will hereinafter be described with reference to the accompanying drawings. It is to be noted that the drawings should be viewed based on the direction of the reference numerals.

FIG. 1 is a left lateral view of a motorcycle according to the present invention. A motorcycle 10 includes main frames 12L, 12R (only reference numeral 12L on the front side is shown) extending obliquely downwardly and rearwardly from the upper portion of a head pipe 11. Down frames 13L and 13R (only reference numeral 13L on the front side is shown) extend obliquely downwardly and rearwardly from the lower portion of the head pipe 11 and then extend approximately downwardly and lastly extend rearwardly, and are joined to the main frames 12L and 12R, respectively. The motorcycle 10 further includes seat rails 14L and 14R (only reference numeral 14L on the front side is shown) extending obliquely upwardly and rearwardly from the rear portions of the main frames 12L and 12R, respectively. Middle frames 17L and 17R (only reference numeral 17L on the front side is shown) connect the intermediate portions 16L and 16R (only reference numeral 16L on the front side is shown) of the seat rails 14L and 14R with the rear end portions of the main frames 12L and 12R, respectively. Rail stays 18L and 18R (only reference numeral 18L on the front side is shown) connect the upper portions of the middle frames 17L and 17R with the rear portions of the seat rails 14L and 14R, respectively. The motorcycle 10 further includes pivot plates 21L, 21R (only reference numeral 21L on the front side is shown) which span between the seat rail 14L and the middle frame 17L and between the seat rail 14R and the middle frame 17R, respectively, and support a pivot shaft 19. A suspension link 22 extends downwardly from the pivot plates 21L, 21R via the pivot shaft 19. The motorcycle 10 further includes a power unit 24 which extends rearwardly via the suspension link 22 and a support shaft 23 and also serves as up and down swingable rear swing arm. Rear shock absorbers 25L, 25R (only reference numeral 25L on the front side is shown) span between the rear end portion of the power unit 24 and the seat rail 14L. A rear wheel axle 26 is provided at the rear portion of the power unit 24 and serves as a drive shaft with a rear wheel 27 attached to the rear wheel axle 26. The motorcycle 10 further includes a storage box 32 mounted to the seat rails 14L, 14R as elements of a body frame 31 (hereinafter, also called "the vehicle body 31"). A front seat 33 (hereinafter called "the seat 30") covers a front portion 32a of the storage box 32 and on which a rider sits with a rear seat 34 which covers a rear portion 32b of the storage box 32 and on which a pillion passenger sits. A rear spoiler 35 surrounds the rear seat 34. The motorcycle 10 further includes a front fork 36 steerably attached to the head pipe 11 located on the front portion thereof with a front wheel 38 attached to the front fork 36 via a front wheel axle 37 and a steering handlebar 41 attached to the upper end portion of the front fork 36. In addition, the power unit 24 includes an engine 42.

The following is a description of the respective members spanned between the left and right frames. A fuel tank 43 is disposed in an area enclosed by the main frames 12L, 12R and down frames 13L, 13R. A first cross member 44 is located above the fuel tank 43 and spans between the left and right main frames 12L, 12R. A second cross member 45 is located below the fuel tank 43 and spans between the left and night down frames 13L, 13R. A third cross member 46 is located close to the pivot plates 21L, 21R and spans between the left and right seat rails 14L, 14R. A rear cross member 47 spans between the rear end portions of the left and right seat rails 14L, 14R. A stay 48 is provided.

A radiator unit 51 is disposed rearwardly of the front wheel 38 and forward of the down frames 13L, 13R and is adapted to cool the engine 42.

The fuel tank 43 internally includes a fuel pump 53 with a strainer 54 which is installed below the fuel pump 53 to separate foreign matter such as water, dust and the like from the fuel filled in the fuel tank 43. A flow sensor 55 detects the remaining amount of the fuel in the fuel tank 43.

A front disk brake unit 56 is provided together with a front disk plate 57, a front cowl 58 covering the vehicle from the front, a leg shield 59 as an inner cover, a main cowl 61 covering the vehicle from the side, a front fender 62, a rear fender 63, an exhaust pipe 64 extending from the power unit 24, a muffler 65 joined to the rear end of the exhaust pipe 64, a side stand 66, and a main stand 67. The leg shield 59 covers the front portion of the vehicle including the head pipe 11 and is provided continuously with the front cowl 58 so as to have a storage portion at its upper portion.

Figure 2:
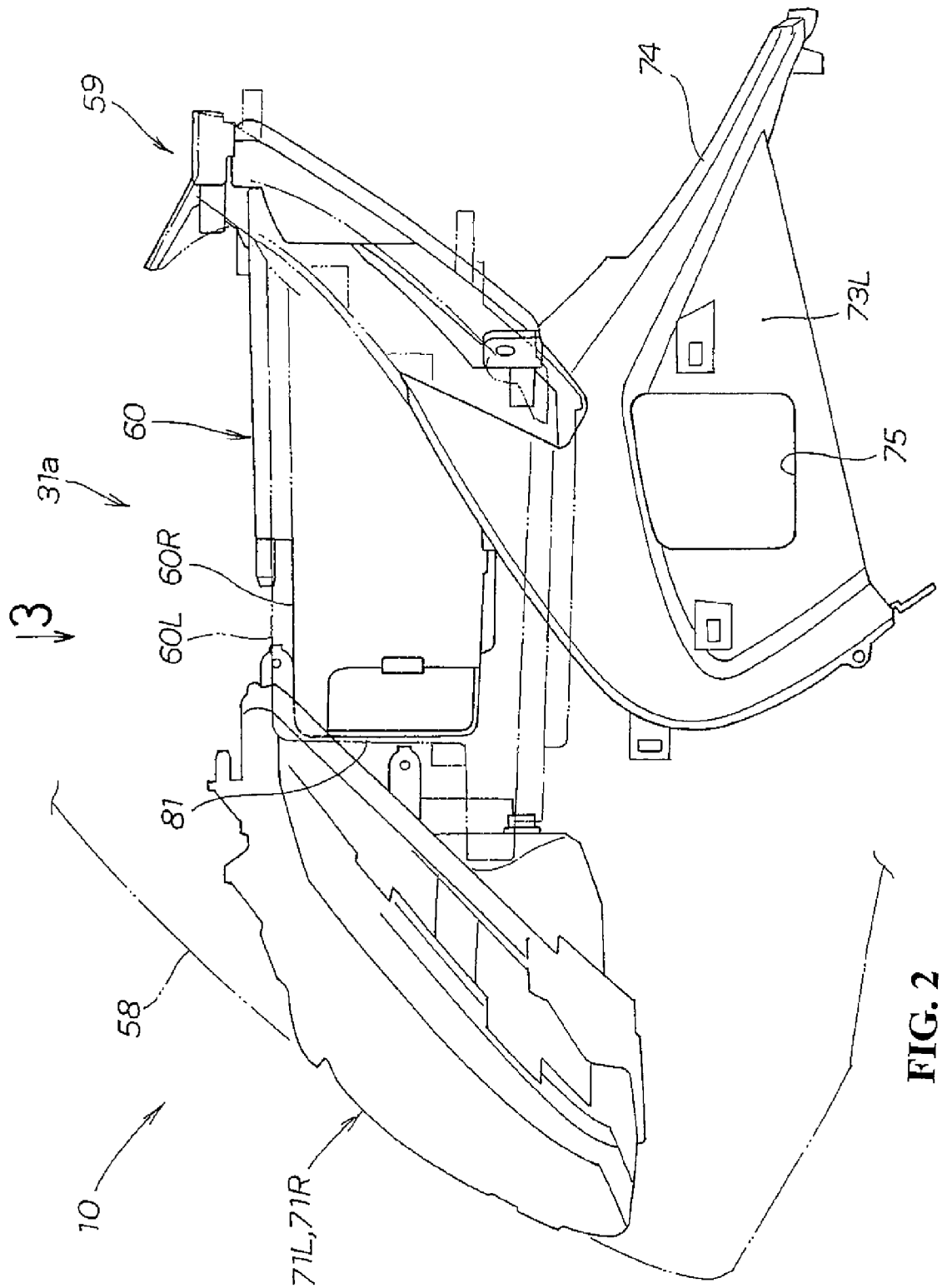
FIG. 2 is a lateral view of an essential portion of the motorcycle according to the present invention.
Figure 3:
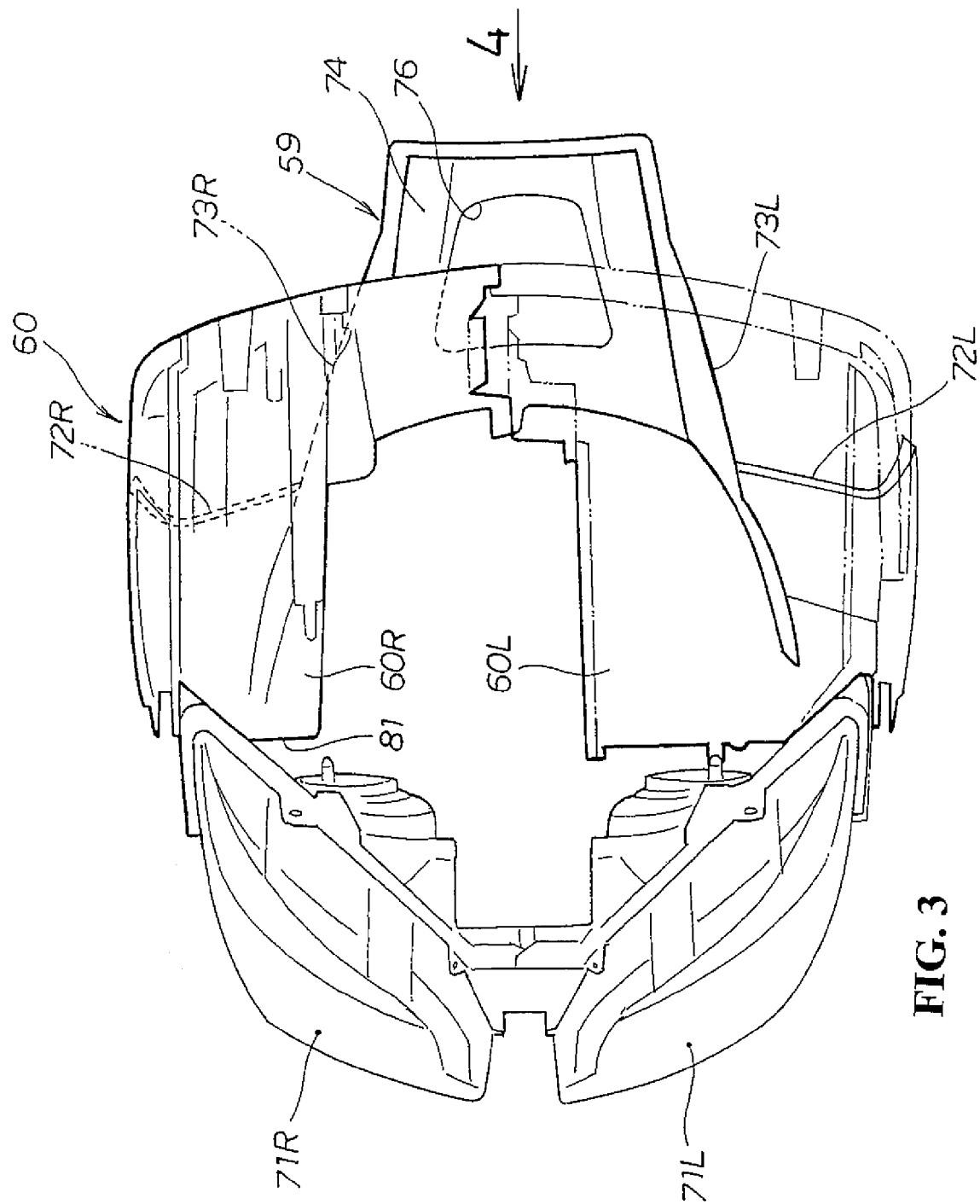
FIG. 3 is a view as viewed from arrow 3 of FIG. 2.
Figure 4:
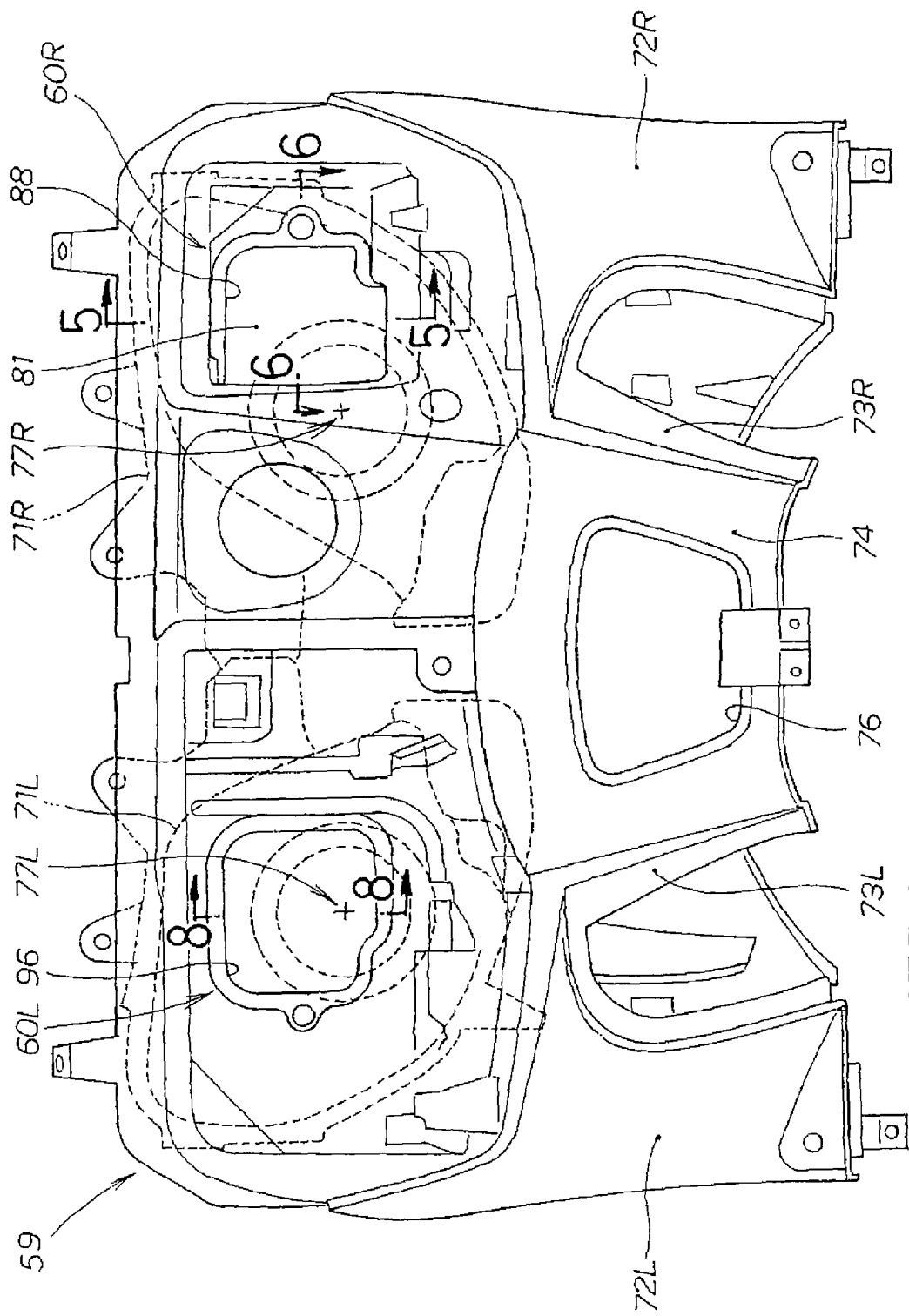
FIG. 4 is a view as viewed from arrow 4 of FIG. 3.

As illustrated in FIGS. 2 to 4, the front cowl 58 covering the vehicle body is provided at a vehicle body front portion 31a of the motorcycle 10. Light devices 71L, 71R are provided at the front cowl 58. The leg shield 59 having a storage portion 60 storing articles therein is provided between the light devices 71L, 71R and the seat (see reference numeral 30 in FIG. 1) on which a rider sits.

The leg shield 59 includes leg shielding portions 72L, 72R provided on the left and right side of the vehicle body to shield the legs of the rider; lateral walls 73L, 73R provided rearwardly of the leg shielding portions 72L, 72R, respectively. A first storage portion 60R is provided above the right leg shielding portion 72R with a second storage portion 60L attached above the left leg shielding portion 72L and a connecting portion 74 connecting the left and right leg shielding portions 72L, 72R. The lateral wall 73L is provided with an opening portion 75. In the FIGS. 2 to 4, an opening 76 is provided for the feed oil lid in the inside of which a filler port of the fuel tank 43 is disposed and which is covered by a feed oil lid not shown.

The right-hand light device 71R as one lamp device is disposed forward of the first storage portion 60R and the left-hand light device 71L as the other lamp device is disposed forward of the second storage portion 60L. In short, the light devices 71L, 71R are a pair of light devices spaced apart from each other on the left and right of the vehicle.

In detail, the first storage portion 60R is disposed near a bulb axis 77R of the right-hand light device 71R of the light devices 71L, 71R and the second storage portion 60L is disposed near a bulb axis 77L of the left-hand light device 71L.

The bulb axis 77R of the right-hand lamp device 71R is disposed outside a back wall 81 forming the storage portion 60R.

Figure 5:
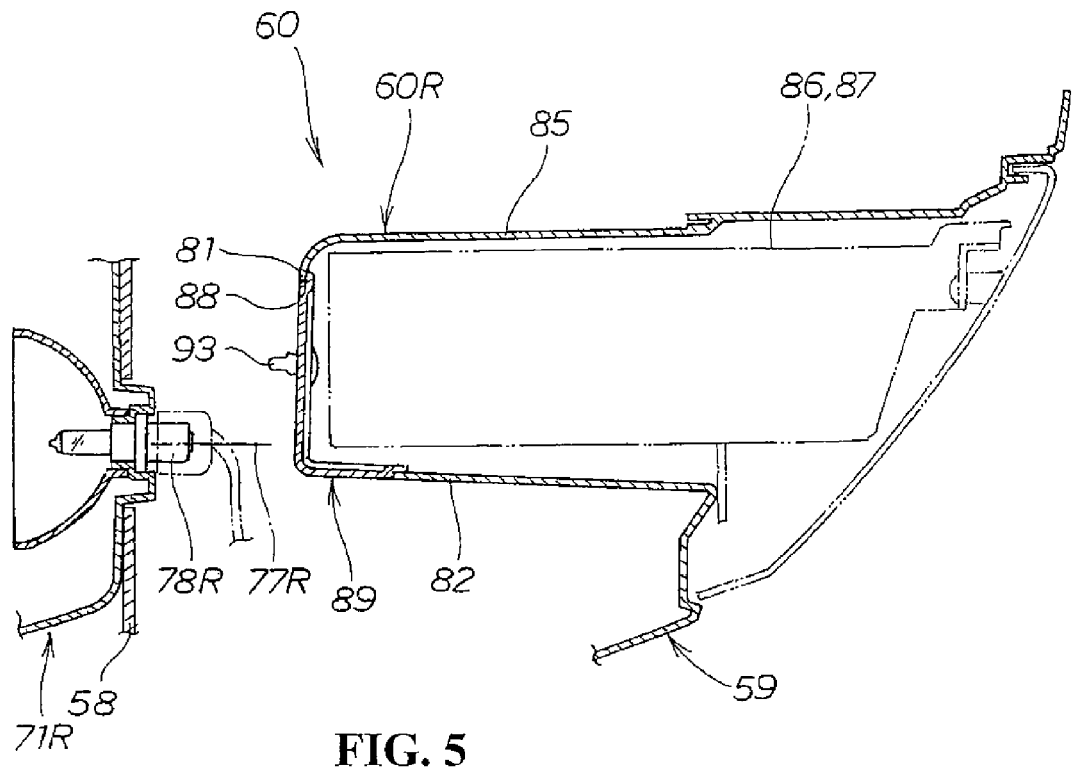
FIG. 5 is a cross-sectional view taken along line 5-5 of FIG. 4.
Figure 6:
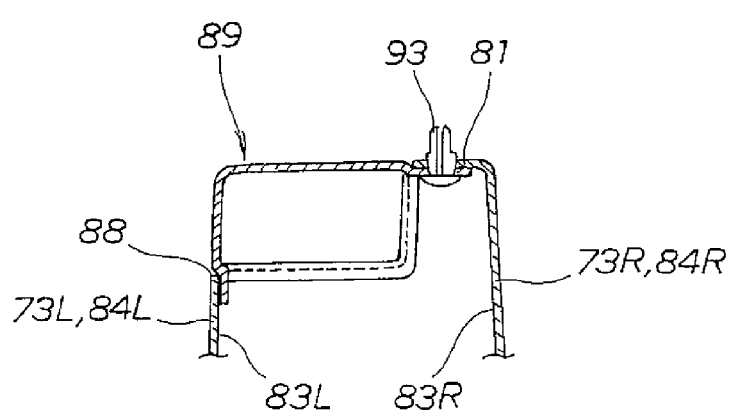
FIG. 6 is a cross-sectional view taken along line 6-6 of FIG. 4.

As illustrated in FIGS. 5 and 6, the storage portion 60 includes a bottom portion 82 extending in the longitudinal direction of the vehicle body with left and right walls 84L, 84R extending upwardly from the left and right sides 83L, 83R, respectively, of the bottom portion 82. A ceiling portion 85 connects the left and night walls 84L, 84R with the back wall 81 closing the backs of the bottom portion 82, left and right walls 84L, 84R and the ceiling portion 85.

The first storage portion 60R is provided with a storage case 86 as a stuff box in an openable and closable manner. This storage case 86 is a drawer 87.

The storage portion 60R is formed with a maintenance opening 88 spanning among the back wall 81, the lateral wall 73L continuous with the back wall 81 and the bottom portion 82 continuous with the back wall 81 and is used to maintain a bulb 78R provided with a lid body 89 detachably covering the maintenance opening 88.

In addition, the maintenance opening 88 may be formed to extend from the back wall 81 to any one of the lateral wall 73L and bottom portion 82 both continuous with the back wall 81. Alternatively, the maintenance opening 88 may reasonably be formed to extend from the back wall 81 to the lateral wall 73R and (or) to the ceiling portion 85 both continuous with the back wall 81.

The light device 71R is disposed forward of the maintenance opening 88 bored in the back wall 81 of the storage portion 60R. The light device 71R has at least one portion that protrudes rearwardly and is attached to the front cowl 58. In addition, the bulb axis 77R of the light device 71R is disposed near the back wall 81.

Returning to FIG. 4, as viewed from the rearward of the vehicle, the bulb axis 77R of the light device is disposed outside the back wall 81 and the maintenance opening 88 is provided to extend from the back wall 81 to at least the lateral wall 73R closer to the bulb axis 77R.

Figure 7A:
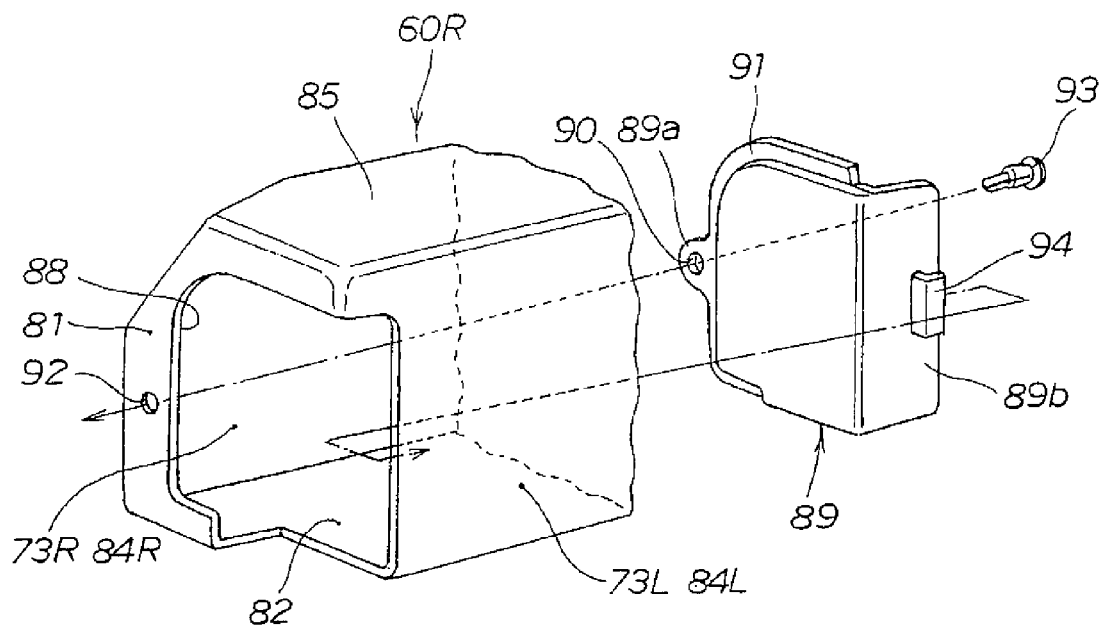
FIGS. 7a and 7b include a perspective view of a lid body according to the present invention and a functional view for assistance in explaining the fact that an opening is closed by the lid body.
Figure 7B:
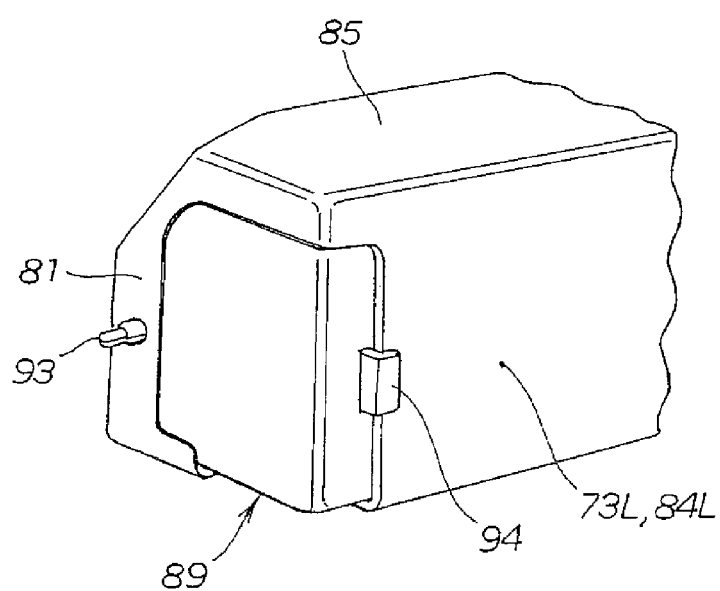

FIGS. 7(a) and 7(b) include a perspective view of a lid body according to the present invention and a functional view for assistance in explaining the closing of the opening by the lid body. The lid body 89 is circumferentially provided with a flange portion 91 which is formed between the lid body 89 and the maintenance opening 88 bored in the back wall 81 so as to seal a gap defined therebetween. The lid body 89 is provided at one end 89a with a hole portion 90 corresponding to a hole portion 92 of the first storage portion 60R and at the other end 89b with an engaging portion 94 to be engaged with the first storage portion 60R. The lid body 89 is detachably provided at the storage portion 60R by allowing the engaging portion 94 to engage the storage portion 60 and by inserting an engaging member 93 into the hole portion 90 and into the hole portion 92.

As illustrated in FIG. 5, the maintenance opening 88 is continuously formed to extend from the back wall 81 to the left wall 73L which is the lateral surface and concurrently the storage case 86 is formed as the drawer 87. Thus, the drawer 87 can block the maintenance opening 88 and the lid body 89. Since the drawer 87 is provided in the first storage portion 60R, the maintenance opening 88 and lid member 89 can be made inconspicuous from the outside of the vehicle, which can prevent the external appearance of the vehicle from being impaired.

In the lid body 89, the engaging portion 94 is engaged with the first storage portion 60R and the engaging member 93 is inserted into the hole portion 90 and into the hole portion 92. The engaging portion 94 is integrally formed with the other end 96b of the lid body 89. Thus, the lid body 89 can be formed easily.

In addition, since the number of engaging positions using the engaging portion 94 is one, the number of parts for the engaging portion 94 can be reduced, thereby suppressing the cost of parts for the lid body 89.

Figure 8:
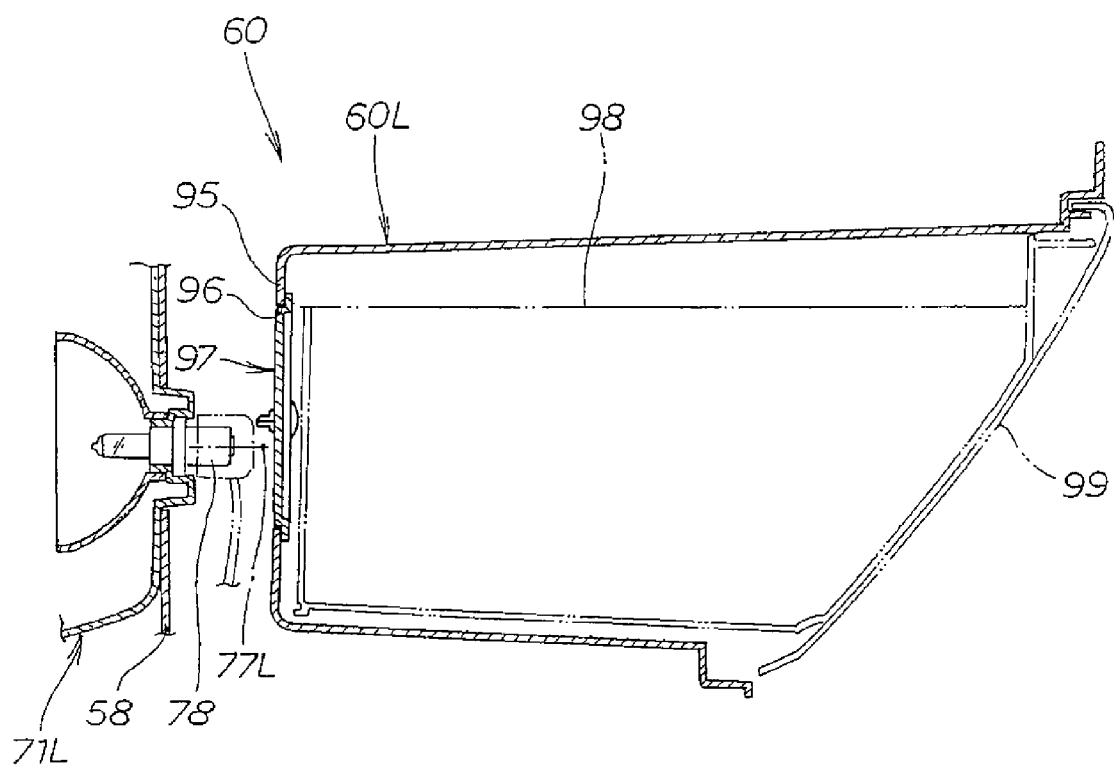
FIG. 8 is a cross-sectional view taken along line 8-8 of FIG. 4.

FIG. 8 is a cross-sectional view taken along line 8-8 of FIG. 4. The second storage portion 60L is disposed near the bulb axis 77L of the left-hand light device 71L of the left-hand and right-hand light devices 71L, 71R. The second storage portion 60L having a back wall larger than the back wall 81 of the first storage portion 60R as illustrated in FIG. 5. The second storage portion 60L is provided with a second maintenance opening 96.

In FIG. 8, a drawer 98 and an external appearance member 99 are provided.

Since a lid member 97 is detachably attached to the second maintenance opening 96, a bulb 78L of the left light device 71L can easily be replaced by removing the lid member 97 and by passing a hand through the second maintenance opening 96.

A description is next made of the function of the maintenance opening provided at the storage portion described above.

Figure 9:
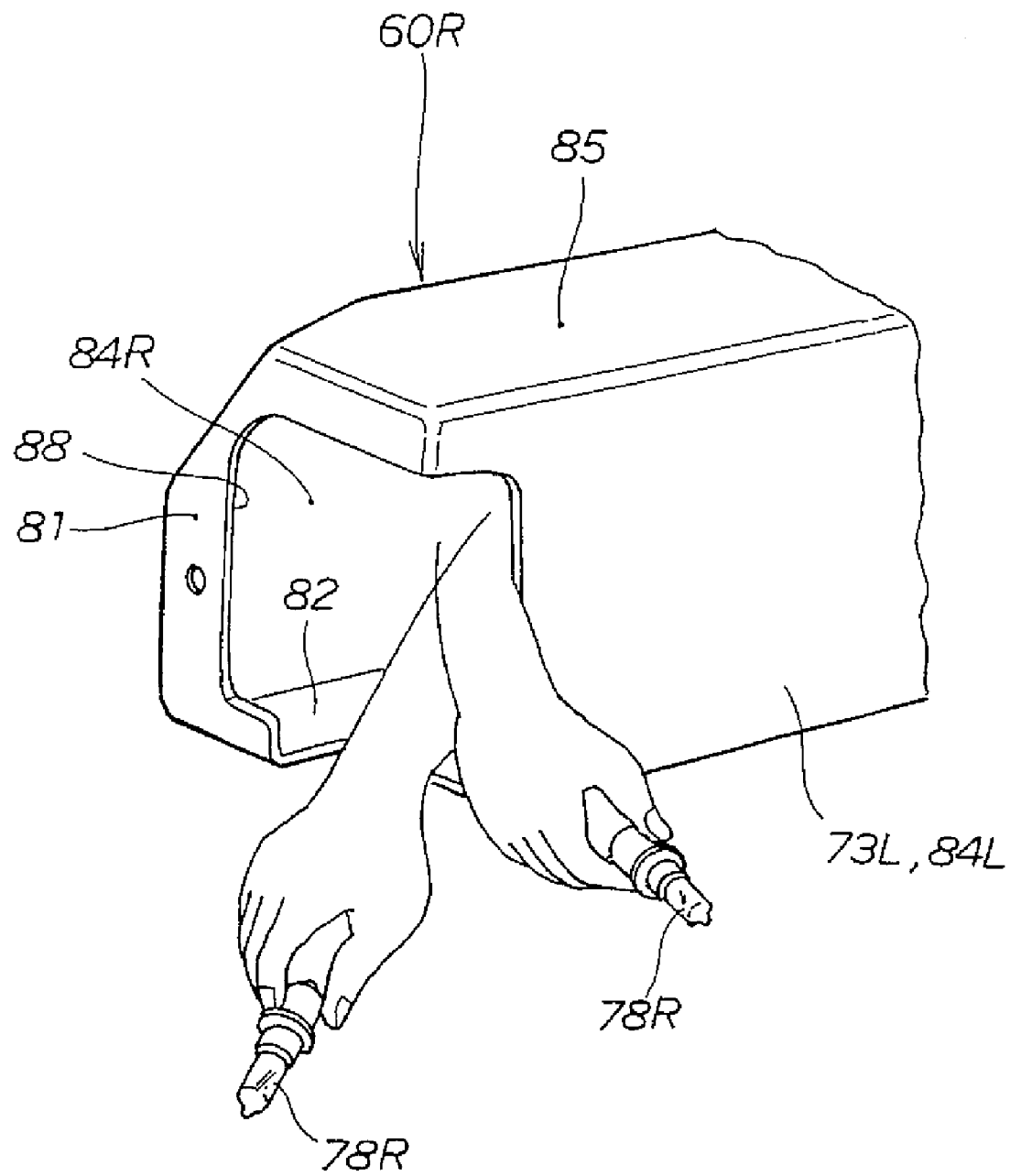
FIG. 9 is a functional view for assistance in explaining the fact that a hand is passed through the opening portion according to the present invention and the bulb of a light device is operated.

FIG. 9 is a functional view for assistance in explaining the operating of the bulb of the light device by passing a hand through the opening portion according to the present invention. A description is made with reference to FIG. 5 as well as FIG. 9.

A light device bulb 78R is disposed near the back wall 81. The first storage portion 60R is provided with a maintenance opening 88 adapted to maintain the bulb 78R. The maintenance opening 88 is formed to span among the back wall 81, a left wall 73L which is one lateral wall continuous with the back wall 81, and a bottom portion 82 continuous with the back wall 81.

In this way, the maintenance opening 88 can largely be ensured without being influenced by the sizes of the surfaces of the first storage portion 60R composed of the back wall 81, left and right walls 84L, 84R, bottom portion 82 and ceiling portion 85.

In addition, in relation to the bulb 78R, it is reasonable that the maintenance opening 88 may continuously be formed to extend from the back wall 81 to the right wall 73R and from the back wall 81 to the ceiling portion 85.

If the maintenance opening 88 can be increased in size, the bulb 78R of the light device can easily be replaced by removing the lid body 89 as illustrated in FIG. 7, by passing a hand through the maintenance opening 88 and by reaching out the hand for the bulb 78R. Thus, maintenance such as replacement of the bulb 78R or the like can be performed without the removal of the leg shield 59, thereby significantly enhancing the maintenance performance of the light device 71R.

In addition, since the maintenance opening 88 is increased in size, design restrictions can be reduced. For example, it becomes not necessary to otherwise determine the position of the storage portion 60R provided at the leg shield 59 as illustrated in FIGS. 7a and 7b taking into account the maintenance performance for the bulb 78R of the light device.

Since the design restrictions are reduced, the flexibility of the vehicle design can be increased.

With reference to FIGS. 4, 5 and 8, the lamp devices 71L, 71R are spaced apart from each other on the right and left of the vehicle and formed as a pair of lamp devices. The maintenance opening 88 is disposed near the bulb axis 77R of the right-hand lamp device 71R of the lamp devices 71L, 71R. The second storage portion 60L larger in size than the back wall 81 is disposed near the bulb axis 77L of the left-hand light device 71L of the light devices 71L, 71R. The second storage portion 60L is provided with the second maintenance opening 96.

The maintenance opening 88 and the second maintenance opening 96 are provided near the left and right light devices 71L and 71R, respectively. Therefore, both the left-hand and right-hand bulbs 78L, 78R of the light devices can be replaced by passing a hand through the maintenance openings 88, 96, respectively. Since the bulbs 78L, 78R can be replaced by passing a hand through the maintenance opening 88 and the second maintenance opening 96 located near the bulbs 78L, 78R, respectively, maintenance for the bulbs 78L, 78R can further easily be performed.

In the embodiment, the maintenance opening 88 is disposed on the right side of the vehicle and the second maintenance opening 96 is disposed on the left side of the vehicle. However, it is reasonable that the storage portion 60R having the maintenance opening 88 is disposed on the left side and the second storage portion 60L is disposed on the right side.

In addition, it is reasonable that in the leg shield 59 the positions of the first storage portion 60R and the second storage portion 60L are appropriately changed above and below or right and left.

The maintenance opening 88 is provided to extend from the back wall 81 to at least the left wall 73L which is a lateral wall closer to the bulb 78R. Therefore, the area of the maintenance opening 88 is increased by the extension to the left wall 73L. When the lid body 89 is removed and a hand is passed through the maintenance opening 88, even if the position of the bulb center of the light device 71R is offset from the position of the maintenance opening 88, maintenance work for the bulb 78R can easily be performed by reaching out a hand for the bulb 78R of the light device. Thus, an area where the bulb 78R can be replaced is expanded, which reduces restrictions, thereby enhancing design flexibility.

The bulb axis of the light device may be disposed inside the back wall or on the extension of the back wall as viewed from the rearward of the vehicle. In addition, the maintenance opening may be provided to extend from the back wall at least to the lateral wall remoter from the bulb axis of the light device.

Further, it is reasonable that the storage case provided for the storage portion is omitted and the storage portion is configured to have an inlet which is closed by a lid or the like in an openable and closable manner.

The present invention is suitable for the front portion structure of a vehicle in which a storage portion is provided with a maintenance opening used to maintain a bulb.

Figure 10:
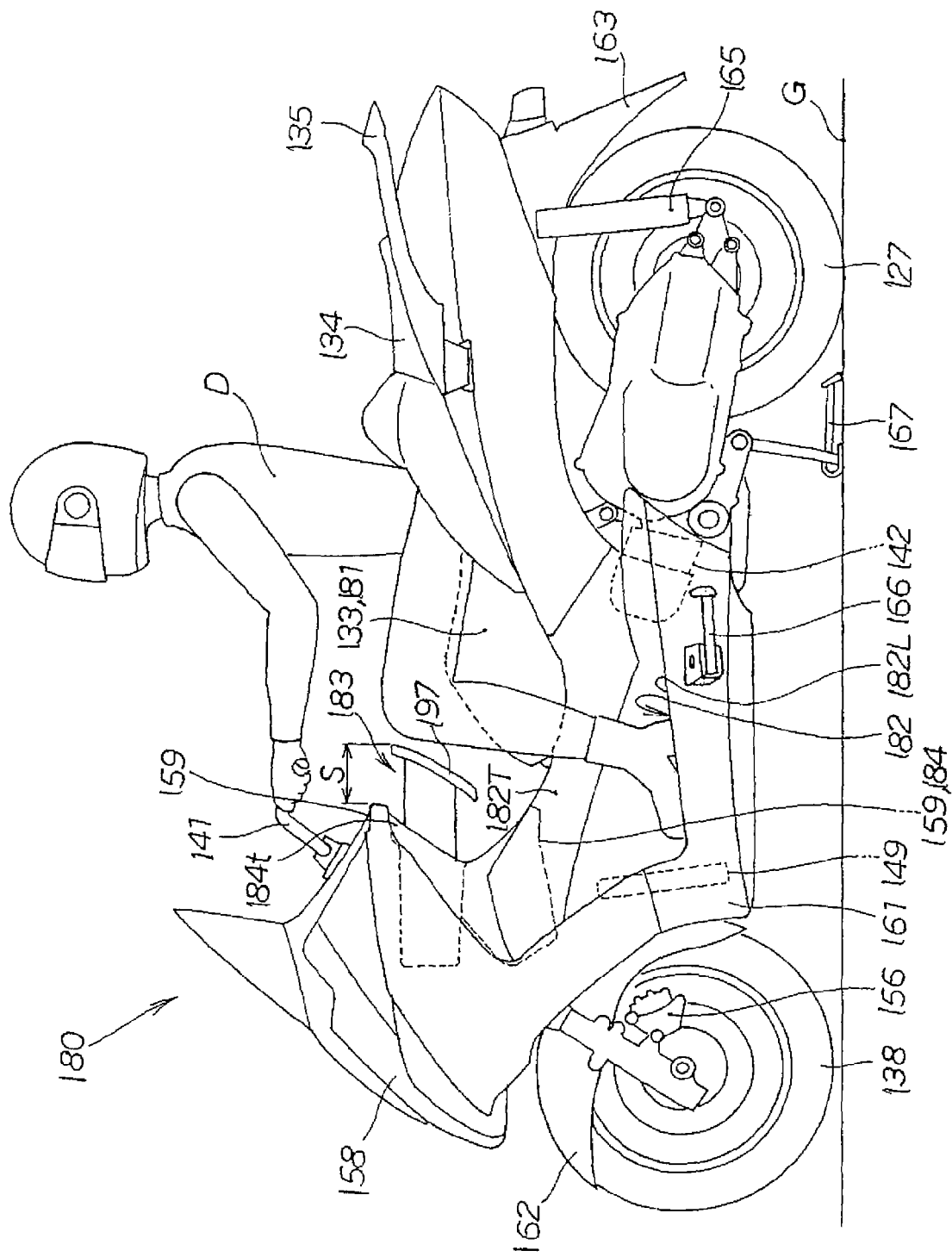
FIG. 10 is a left lateral view of the motorcycle, for assistance in explaining the arrangement of a stuff box according to the present invention.

FIG. 10 is a left lateral view of the motorcycle for assistance in explaining the arrangement of a stuff box according to the present invention. A scooter type vehicle 180 (hereinafter also called "the low floor type vehicle 180" or simply "the vehicle 180") includes a steering handlebar 141 steered by the rider D, a radiator 149 (a radiator unit 149) for cooling the cooling water of a water-cooled engine 142 disposed under a front seat 133, a seat 181 on which the rider D sits and a step floor 182 which is disposed between the steering handlebar 141 and the seat 181 and on which the rider's feet are placed. An inner cover 159 is disposed forward of the step floor 182. The step floor 182 includes left and right foot placing portions 182L, 182R (only reference numeral 182L on the left side is shown) and a tunnel portion 182T connecting the left and right foot placing portions 182L, 182R and formed to protrude upward.

The inner cover 159 has an upper portion 184t protruding toward the rider side and including a stuff box portion 183 (the stuff box 183) and shields the legs of the rider D sitting on the seat 181 and serves as a wind guard. The inner cover 159 may be called the leg shield 184.

The leg shield 184 is configured to connect the foot placing portions 182L, 182R and the tunnel portion 182T. In other words, the leg shield 184 is provided to be continuous with the step floor 182.

The vehicle 180 is provided at its front portion with the leg shield 184 which covers the front of the legs of the rider sitting on the seat 181 and includes the upper portion having the stuff box 183.

Figure 11:
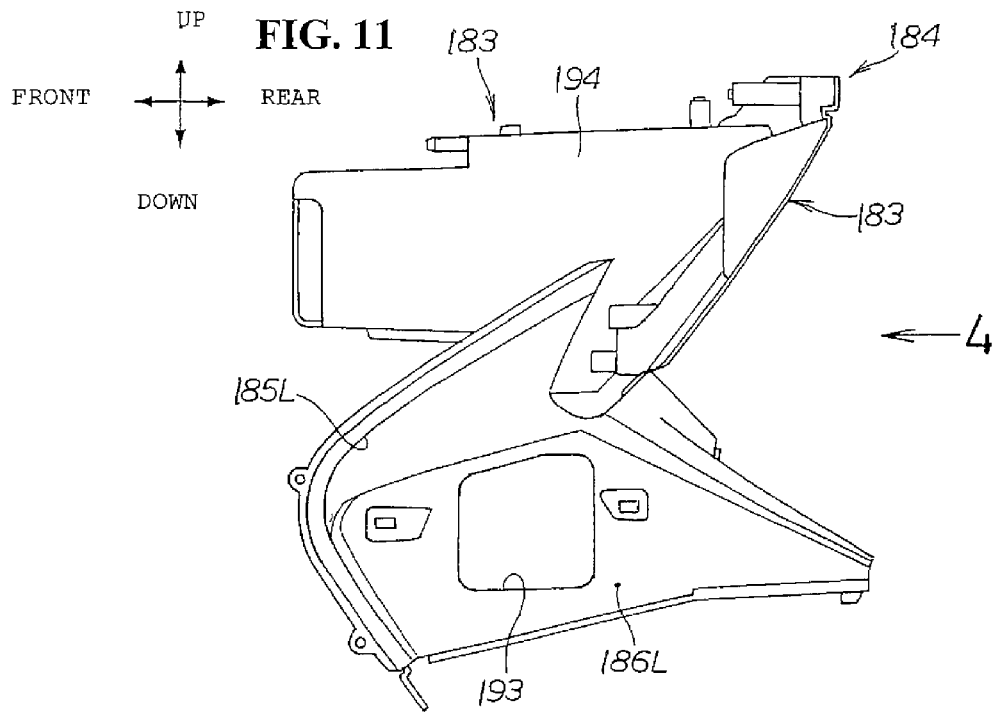
FIG. 11 is a lateral view of a leg shield attached to a vehicle front portion according to the present invention.
Figure 12:
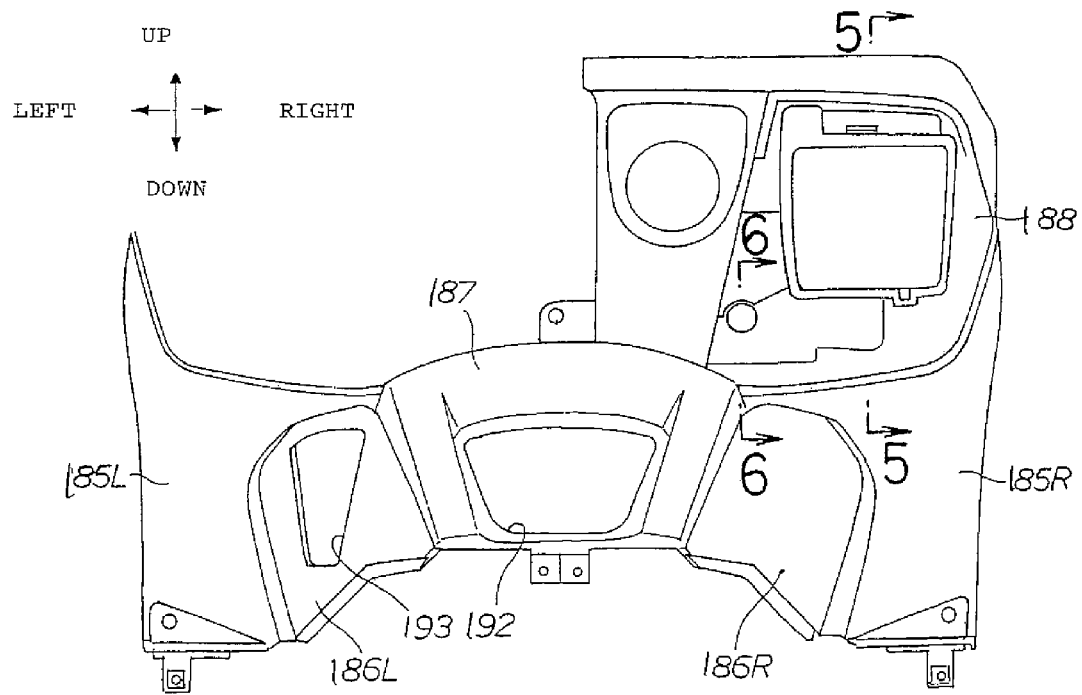
FIG. 12 is a view as viewed from an arrow 4 of FIG. 11.

FIG. 11 is a lateral view of the leg shield attached to the vehicle front portion according to the present invention and FIG. 12 is a view as viewed from an arrow 4 of FIG. 11. A description is below made with reference to FIGS. 11 and 12.

The leg shield 184 includes leg-shielding portions 185L, 185R; left and right lateral walls 186L, 186R with a connecting portion 187, a plate-like panel 188 and a stuff box 183. The leg-shielding portions 185L, 185R are provided to extend right and left and shield the rider's legs. The left and night lateral walls 186L, 186R are joined respectively to the left and right leg-shielding portions 185L, 185R and extend approximately rearward. The connecting portion 187 connects the left and right lateral walls 186L, 186R. The plate-like panel 188 extends upward from the right leg-shielding portion 185R. The stuff box 183 is provided in the panel 188. The lateral wall 186L of the leg shield 184 is provided with an opening portion 193 used to feed water to the radiator 149. An opening 192 is provided for feed oil, inside which a filler port of the fuel tank 143 is disposed and which is covered by a feed oil lid not shown.

The panel 188 is provided to face the rider and integrally with a case body 194 constituting the stuff box 183.

Figures 13, 14:
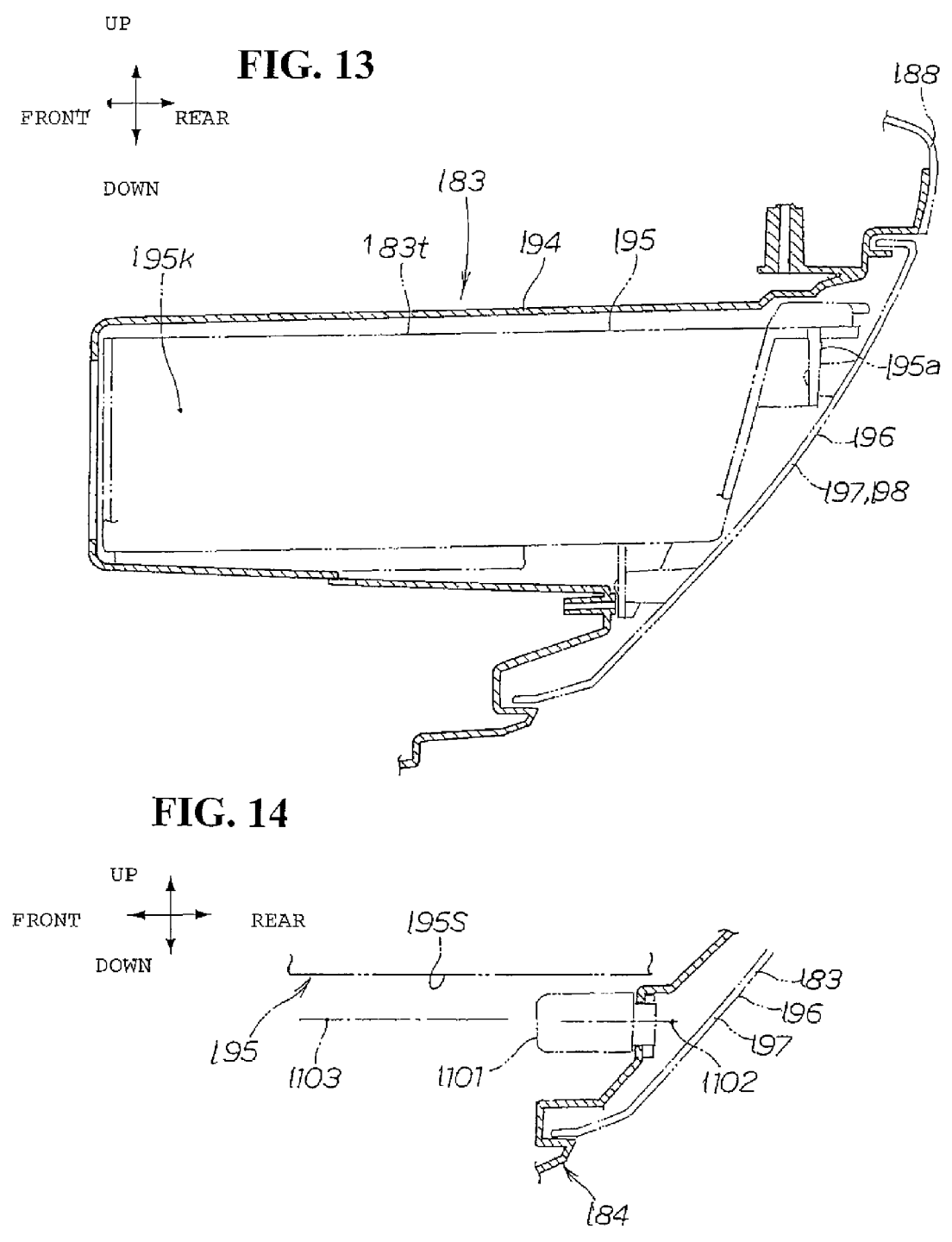

FIG. 13 is a cross-sectional view taken along line 5-5 of FIG. 12. The stuff box 183 is provided with the box-like case body 194 extending forward of the vehicle from the panel 188. A drawer 195 is provided inside the case body 194. Articles are stored in the drawer 195.

An appearance member 197 having a design surface 196 is attached to one end 195a of the drawer 195. The design surface 196 is attached so as to be flush with and smoothly continuous with the surface of the panel 188 when the drawer 195 is closed. The appearance member 197 is a component including a knob portion 198 on which a hand of the rider is put to open the drawer 195.

If the stuff box 183 is provided with the drawer 195 and the drawer 195 and the knob portion 198 are composed of different parts, the shape of the stuff box 183 and the shape of the appearance member 197 can freely be set. Since the flexibility of setting the shape is enhanced, it is possible to enhance the external appearance of the appearance member 197 while sufficiently ensuring the capacity of the stuff box 183.

FIG. 14 is a cross-sectional view taken along line 6-6 of FIG. 13. A key cylinder 1101 is disposed so that a key cylinder axis 1102 is approximately parallel to a longitudinal axis 1103 of the vehicle. The key cylinder 1101 is disposed at the leg shield 184 so as to face the rider sitting on the seat. The stuff box 183 is provided with the appearance member 197 forming the design surface 1196 of the leg shield 184 so that the key cylinder 1101 is covered by the appearance member 197 when the stuff box 183 is closed.

With reference to FIGS. 12 and 14, the stuff box 183 is the drawer 195 having an opening 195k at an upper surface 183t and the key cylinder 1101 is disposed below a bottom portion 195s of the drawer 195. Thus, the key cylinder 1101 can be disposed at a position further less-visible from the third party. Since the position of the key cylinder 1101 is less-visible from the third party, tampering or theft can further be prevented.

Figure 15:
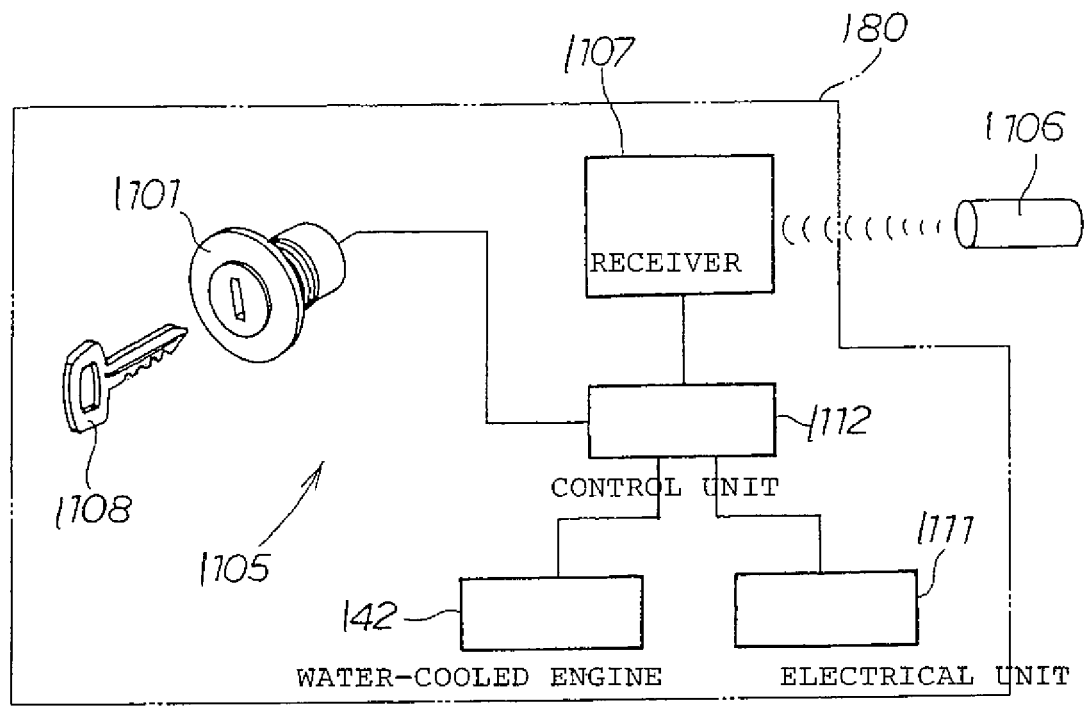
FIG. 15 is a view for assistance in explaining the configuration of an electronic key system according to the present invention.

FIG. 15 is a diagram for assistance in explaining the configuration of an electronic key system according to the present invention. An electronic key system 1105 includes, as main constituent elements, a portable transmitter 1106 the rider takes along; a key cylinder 1101 that mechanically enables a start or operation of the vehicle 180 by insertion-operating a key 1108 adaptable when authentication is not established by a receiver 1107 and the electric key system 1105 provided in the vehicle 180; and a control unit 1112 for controlling the water-cooled engine 142 and an electrical unit 1111 of the vehicle.

Normally, start of the vehicle or operation of the vehicle is enabled only when authentication is established between the portable transmitter 1106 and the receiver 1107. Non-normally, the start or operation of the vehicle is mechanically enabled by insertion-operating the adaptable key 1108.

A description is next made of the function of the key cylinder arrangement structure of the vehicle described above.

Figure 16A:
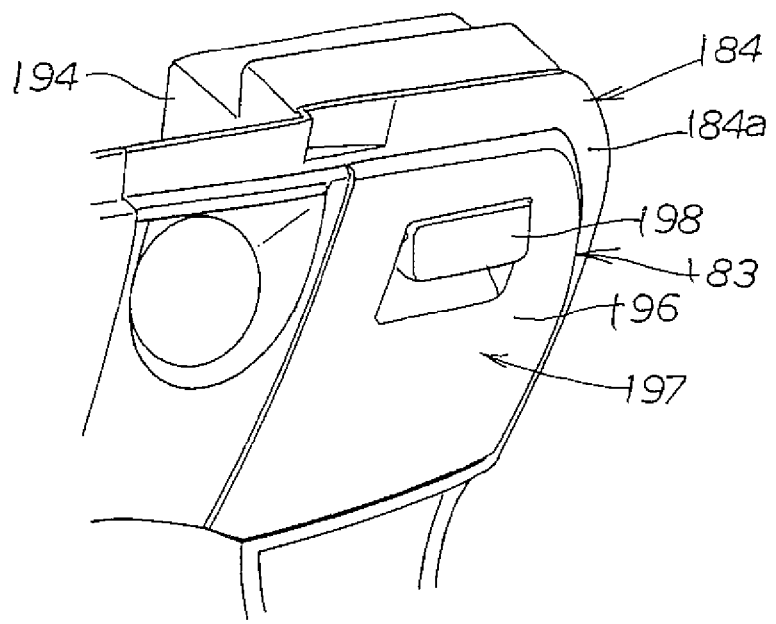
FIGS. 16(a) and 16(b) are functional views of a key cylinder arrangement structure of a vehicle.
Figure 16B:
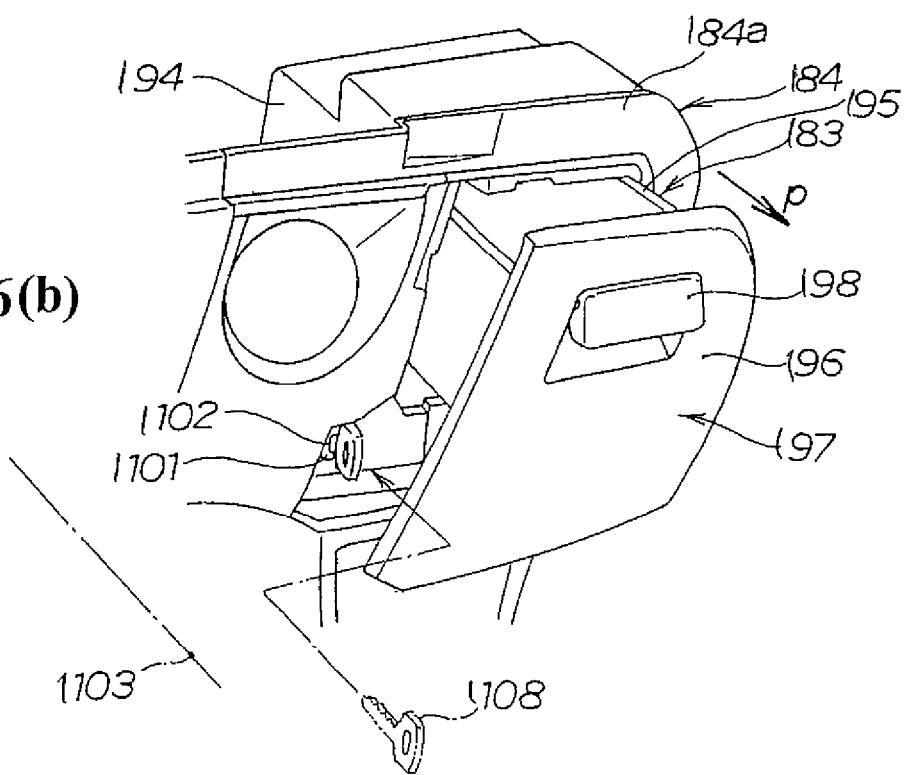

FIGS. 16(a) and 16(b) include functional views of the key cylinder arrangement structure of the vehicle, illustrating the fact that the start or operation of the vehicle is enabled by inserting the key into the key cylinder.

FIG. 16(a) illustrates a state where the drawer 195 of the stuff box 183 is closed. The design surface 196 of the appearance member 197 is configured to smoothly join with the outer surface 184a of the leg shield 184.

FIG. 16(b) illustrates a state where the drawer 195 of the stuff box 183 is opened. The drawer 195 is pulled out in the direction of an arrow p by a hand put on the knob portion 198.

The key cylinder 1101 is disposed at the leg shield 184 so that the key cylinder axis 1102 is approximately parallel to the longitudinal axis 1103 of the vehicle. This makes it easy to insert the key 1108 into the key cylinder 1101. Thus, the operability of the key cylinder 1101 can significantly be enhanced. In addition, the key cylinder 1101 is covered by the appearance member 197 when the stuff box 183 is closed. Thus, the key cylinder 1101 can be made less-visible from the third party, thereby preventing tampering or theft.

In short, the present invention can maintain crime-prevention while enhancing the operability of the key cylinder 1101.

Returning to FIG. 10, the stuff box 183 is openable in a range where it does not come into contact with the legs of the rider D sitting on the seat 181. Even if the key cylinder 1101 is intended to be operated, for example, by inserting a long tool or the like, the tool interferes with the appearance member 197 of the stuff box, which makes it difficult to insert the tool or the like into the key cylinder 1101. In other words, the opening stroke of the stuff box 183 is limited to a stroke S in which the stuff box 183 is made openable in a range where it does not come into contact with the legs of the rider D. This can further suppress tampering or the like. In addition, since the stuff box 183 is unlikely to hit the legs of the rider, easiness of mount and dismount is not damaged.

With reference to FIGS. 10 and 12, the key cylinder 1101 is disposed at a position close to the tunnel portion 182T formed to protrude upward and to the center of the vehicle body.

When the key cylinder 1101 is operated, for example, by inserting a long tool or the like thereinto, the tool interferes with the tunnel portion 182T. This makes it difficult to insert the tool into the key cylinder 1101. In short, since the key cylinder 1101 is disposed close to the tunnel portion 182T, tampering or the like can further be prevented.

In addition, it is reasonable that the key cylinder is disposed at a position approximately equal in height to or above the bottom portion of the drawer.

In addition, it is reasonable to provide the knob portion separately from the appearance component.

Further, it is reasonable to optionally set the opening stroke of the stuff box.

The present invention is suitable for a low floor type vehicle that includes left and right foot placing portions on which the feet of a rider are placed and a tunnel portion which connects the left and right foot placing portions and protrudes upward.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A key cylinder arrangement structure for a vehicle comprising:
    an electronic key system for enabling a start or operation of the vehicle only when authentication is established between a portable transmitter taken along by a rider and a receiver installed in the vehicle;
    a leg shield which covers the front of the leg of the rider sitting on a seat and has an upper portion including a stuff box; and
    a key cylinder which mechanically enables a start or operation of the vehicle by insertion-operating a key adaptable when the electric key system does not establish authentification;
    wherein the key cylinder is disposed so that a key cylinder axis is parallel to the longitudinal axis of the vehicle and is provided at the leg shield so as to face the rider sitting on the seat;
    the stuff box is provided with an appearance member forming a design surface of the leg shield; and
    the key cylinder is covered by the appearance member when the stuff box is closed;
    wherein the stuff box is a drawer having an opening at an upper surface thereof and the key cylinder is disposed below a bottom portion of the drawer.

2. The key cylinder arrangement structure for a vehicle according to claim 1, wherein the appearance member is a component constituting a knob portion on which a hand of the rider is put when the drawer is opened.

3. The key cylinder arrangement structure for a vehicle according to claim 2, wherein the stuff box is openable in a range where the stuff box does not come into contact with the leg of the rider sitting on the seat while at the same time restricting tampering of the key cylinder.

4. The key cylinder arrangement structure for a vehicle according to claim 2, wherein the vehicle is a lower floor type vehicle including left and right foot placing portions on which the feet of the rider are placed when the rider mounts on the vehicle and a tunnel portion which connects the left and right foot placing portions and protrudes upward,
    the leg shield is configured to connect with the foot placing portion and with the tunnel portion, and
    the key cylinder is disposed at a position close to the tunnel portion and to the center of a vehicle body thereby restricting access to the key cylinder which suppresses tampering.

5. The key cylinder arrangement structure for a vehicle according to claim 1, wherein the stuff box is openable in a range where the stuff box does not come into contact with the leg of the rider sitting on the seat while at the same time restricting tampering of the key cylinder.

6. The key cylinder arrangement structure for a vehicle according to claim 1, wherein the vehicle is a lower floor type vehicle including left and right foot placing portions on which the feet of the rider are placed when the rider mounts on the vehicle and a tunnel portion which connects the left and right foot placing portions and protrudes upward,
    the leg shield is configured to connect with the foot placing portion and with the tunnel portion, and
    the key cylinder is disposed at a position close to the tunnel portion and to the center of a vehicle body thereby restricting access to the key cylinder which suppresses tampering.

* * * * *